US006779815B2

(12) United States Patent
Vandeputte

(10) Patent No.: US 6,779,815 B2
(45) Date of Patent: *Aug. 24, 2004

(54) FORGERY PROOF, INDELIBLY MARKED LABEL HAVING CONTRAST TO AID VISIBILITY

(75) Inventor: Bernard Vandeputte, Courbevoie (FR)

(73) Assignee: Societe Chevillot S.A., Albi Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,357

(22) PCT Filed: Apr. 6, 1998

(86) PCT No.: PCT/FR98/00690

§ 371 (c)(1),
(2), (4) Date: Oct. 18, 1999

(87) PCT Pub. No.: WO98/48398

PCT Pub. Date: Oct. 29, 1998

(65) Prior Publication Data

US 2003/0197365 A1 Oct. 23, 2003

(30) Foreign Application Priority Data

Apr. 18, 1997 (FR) ............................................. 97 04996

(51) Int. Cl.[7] .............................................. B42D 15/00
(52) U.S. Cl. ........................ 283/67; 40/299.01; 40/300; 283/74; 283/81
(58) Field of Search .............................. 40/299.01, 300, 40/301, 302, 303, 304; 283/74, 67, 75, 81, 91, 94

(56) References Cited

U.S. PATENT DOCUMENTS

| | | | | |
|---|---|---|---|---|
| 3,930,924 A | * | 1/1976 | Oka et al. ................... | 156/268 |
| 4,103,043 A | * | 7/1978 | Hsieh et al. .................. | 427/49 |
| 4,316,766 A | * | 2/1982 | Levin et al. ................. | 156/631 |
| 4,317,990 A | * | 3/1982 | Zmokly et al. ............. | 235/494 |
| 4,451,068 A | * | 5/1984 | Hall et al. ................... | 283/110 |
| 4,457,540 A | * | 7/1984 | Hohne ......................... | 283/94 |
| 4,581,834 A | | 4/1986 | Zatkos et al. | |
| 4,590,366 A | * | 5/1986 | Rothfjell ..................... | 235/494 |
| 4,627,642 A | * | 12/1986 | Peronneau et al. .......... | 283/94 |
| 4,646,455 A | | 3/1987 | Gardner | |
| 4,732,410 A | * | 3/1988 | Holbein et al. ............. | 283/100 |
| 4,748,452 A | * | 5/1988 | Maurer ....................... | 346/1.1 |
| 5,020,831 A | * | 6/1991 | Benardelli ................... | 283/94 |
| 5,042,842 A | * | 8/1991 | Green et al. ................. | 283/94 |
| 5,206,496 A | * | 4/1993 | Clement et al. ............ | 250/271 |
| 5,356,685 A | * | 10/1994 | Fleming et al. ............. | 428/64 |
| 5,520,417 A | * | 5/1996 | Kennemer ................... | 283/74 |
| 5,653,900 A | * | 8/1997 | Clement et al. ....... | 219/121.68 |
| 5,683,786 A | * | 11/1997 | Kavanaugh ................ | 428/195 |
| 5,767,483 A | * | 6/1998 | Cameron et al. ...... | 219/121.85 |
| 5,866,644 A | * | 2/1999 | Mercx et al. ............... | 524/417 |
| 6,211,117 B1 | * | 4/2001 | Haggerty et al. .......... | 503/227 |

FOREIGN PATENT DOCUMENTS

| | | | |
|---|---|---|---|
| EP | 0145474 | * | 6/1985 |
| GB | 2083726 | * | 3/1982 |
| WO | WO 95 34263 | | 6/1995 |

* cited by examiner

Primary Examiner—Monica S. Carter
(74) Attorney, Agent, or Firm—Blakely Sokoloff Taylor & Zafman

(57) ABSTRACT

The invention concerns a tamper-resistant and indelible method for marking objects, in particular labels, providing marking with good contrast and enhanced visibility. Said method is essentially characterised in that the marking is carried out in two operations: integral marking, i.e. in the thickness of the object; surface marking; said surface marking being superposed on the integral marking. The invention also concerns a marking label.

14 Claims, 1 Drawing Sheet

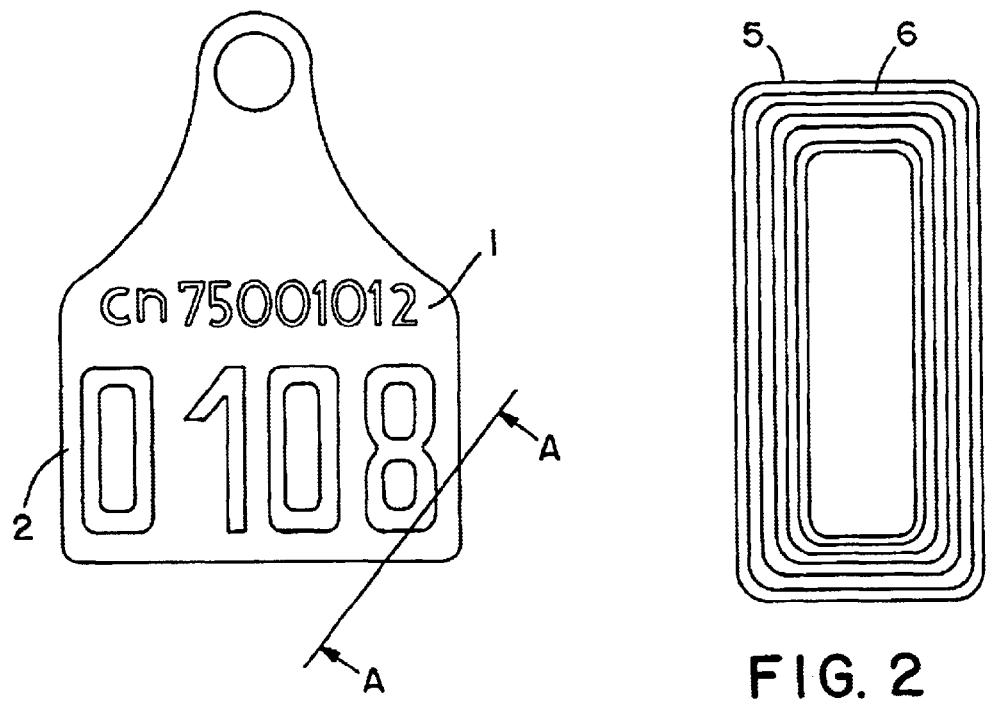
FIG. 1
FIG. 2
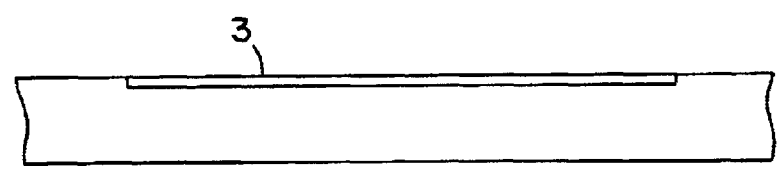
FIG. 3
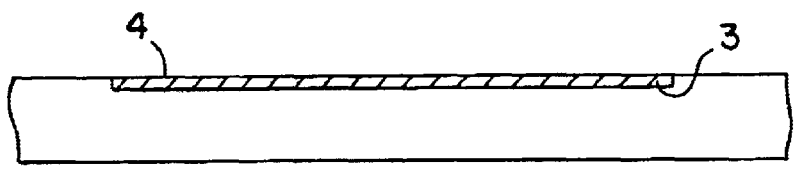
FIG. 4

FORGERY PROOF, INDELIBLY MARKED LABEL HAVING CONTRAST TO AID VISIBILITY

BACKGROUND OF THE INVENTION

1. Field of the Invention

The present invention concerns a method of marking objects that is impossible to forge and is visible, providing good contrast and better visibility of marking, and the objects marked in this way.

2. Background Information

The present invention applies to, among other objects, marking labels used for livestock but can have other applications.

The marking of livestock is performed by fixing one or two labels to the animal's ear. The label carries marking constituted by signs and/or figures and/or letters, part of which is used by the farmer to identify the animal in the field.

It has appeared necessary for these numbers to be indelible so as to be tamper-proof and so as not to serve as a medium for fraud. The label carrying the marking is generally made of a known type of synthetic material.

The indelibility of the marking has been achieved to date by the use of laser, which has the effect of producing marking within the body or the thickness of the sheet constituting the label. However, this does not give accentuated contrast in comparison with the colour of the label; hence, reading from a distance is limited. Therefore, in France where labels are salmon-coloured for cattle, the use of laser engraving gives marking that is grey in colour.

The present invention aims to obviate these drawbacks.

BACKGROUND OF THE INVENTION

To this end, the method according to the present invention of marking objects that is impossible to forge, is indelible and has contrast, is characterised essentially in that the marking is performed in two operations, marking within the body, i.e. within the thickness of the object, and surface marking superimposed over said marking within the body.

According to yet another characteristic of the invention, marking is performed in two operations, marking by modifying the structure of the object by a thermochemical phenomenon, and a surface deposit.

According to another characteristic of the invention, the marking within the body is produced by laser engraving and the surface marking superimposed over the former is produced by inking, for example according to what is known as the ink-jet technique; or the other way round, i.e. the surface marking is added first and marking within the body, for example by laser engraving, is performed subsequently.

According to yet another characteristic of the invention, marking within the body is produced by spaced-out lines defining the contour of each sign, letter or figure, for example, between which a space is left, which is covered by the surface marking. Preferably, according to another characteristic of the invention, the lines are parallel.

BRIEF DESCRIPTION OF THE DRAWINGS

Other advantages and characteristics of the invention will become apparent on reading the following description of an embodiment of the invention, given by way of non-exhaustive example illustrated by the attached drawings, in which:

FIG. 1 shows a plan view of a label with marking according to the invention;

FIG. 2 is a partial view showing, seen from above, the marking within the body according to the invention before the superimposition of surface marking;

FIG. 3 is a view in section along the line AA;

FIG. 4 is a view in section along the line AA representing the surface deposition after addition.

DETAILED DESCRIPTION OF THE INVENTION

As illustrated in FIG. 1, the label for marking animals, produced by implementing the method that is the subject-matter of the invention of which it forms an integral part, is constituted by a sheet of flexible synthetic material, for example polyurethane. This label carries marking constituted by signs, particularly letters and/or figures constituting the official identification number.

The letters and/or figures on the top line 1, in small characters, serve to denote the herd concerned. The letters and/or figures on the bottom line 2, larger in size, since they occupy more than half the effective area of the label, serve to identify the animal within said herd.

It has become apparent that if it was essential for the whole number to be indelible and therefore impossible to forge, it was also essential for the second number, the one identifying the animal, to be easy for the farmer to read, even from a distance, hence the dimensional importance given to that part of the number.

The search for tamper-proof properties and the impossibility of erasing the number wholly or partly has very quickly led to the use of marking the label within the body.

The known and envisageable technique of recessed engraving of the signs constituting the number is not satisfactory since it does not modify the colouring of the material of the label. Colouring by the addition of surface pigments is satisfactory from the point of view of the legibility of the number from a distance. However, these pigments can be erased with time, particularly by the use of solvents.

According to the invention, the method used calls for marking in two operations:

marking within the body of the medium constituted by the sheet of the label;

surface marking superimposed over the marking within the body, i.e. produced within the same contour as the signs, figures or letters produced by the first marking.

The converse can be done, i.e. it is possible first to produce surface marking and then to produce marking within the body, superimposed over the former.

This combination of two superimposed markings makes it possible to obtain visible and indelible marking, since even if the surface marking came to be erased or was intentionally erased, the marking within the body remains and makes it possible to detect fraud. In the event of fraud, the signs letters or figures of the fraudulent marking would not be superimposed over the marking within the body.

According to the method that is the subject-matter of the invention, marking within the body is produced by engraving and is hence indelible. The marking is produced according to one embodiment of the invention by modifying the structure of the material of the label by a thermochemical phenomenon and the surface marking is produced by deposition of suitable material, preferably coloured or pigmented. The engraving is carried out by a laser beam or by any other means.

FIG. 3 is a view in section of a label after it has been produced on which the laser marking, with the reference number 3, is illustrated.

FIG. 4 is a view in section of a label after it has been produced on which the surface marking, with the reference number 4, is illustrated, the laser engraving or marking 3 being shown hatched.

According to the invention, the marking is carried out by modifying the structure of the label (or the object to be marked) by a thermochemical phenomenon and by surface deposition of coloured and/or pigmented material.

Marking by laser beam gives signs, letters or figures in a dull colour, in grey shades; however, it has the advantage of penetrating into the body by deep thermal and chemical transformation thereof. It is hence indelible.

Preferably, the surface marking is produced by adding a colouring pigment, which makes it possible to obtain a good effect of visibility of the marking. The pigments can come from a ink according to the known ink-jet technique, or be added in any appropriate manner.

As illustrated in FIG. 2, which is a very enlarged partial view of a sign added to a label according to the invention, the marking within the body is, in one embodiment, produced by parallel lines 5 defining at least the contour of each of the signs, figures or letters to be produced.

Between each of the lines 5, a gap 6 or space is left, covered only by the surface marking, which also covers the whole zone delimited by the marking within the body, one being superimposed over the other. Laser marking can also be carried out without there being the gaps 6 mentioned above.

According to another embodiment, the laser marking is produced by lines forming loops or other geometric figures and defining at least the contour of each of the signs, figures or letters to be produced, the lines being sufficiently far apart to leave between them gaps or spaces intended to be covered by the surface marking.

Within the context of producing marking according to the invention on a label for livestock, at least some of the signs, for example those on the bottom line, are produced by superimposing the marking within the body and the surface marking. However, all the marking of the label can be produced by superimposing the two markings.

What is claimed is:

1. An animal identification label comprising:
   a panel made of a synthetic material, the panel having a thickness and a surface;
   a first sign disposed within the thickness of the panel to indelibly mark the panel;
   said first sign contrasting with and being visible at said surface;
   a second sign applied to said surface, said second sign contrasting with the surface of the panel; and
   the second sign conforming in appearance with the first sign and being superimposed over the first sign to generally obliterate the first sign whereby if the or a part of the first sign becomes removed from the surface the or the part of the second sign previously obliterated by the first sign becomes visible.

2. An animal identification label as claimed in claim 1 wherein the first sign is laser engraved.

3. An animal identification label as claimed in claim 2 wherein the laser engraved first sign includes a patterning of a plurality of lines to form a collective of adjacent spaces and lines, wherein the collective defines a plurality of contours for the first sign.

4. An animal identification label as claimed in claim 2 wherein the second sign is an ink surface deposit.

5. An animal identification label as claimed in claim 2 wherein the panel is made of a flexible synthetic material.

6. An animal identification label as claimed in claim 5 wherein the synthetic material is polyurethane.

7. A method of forgery proof marking an animal identification label, the label including a body made of synthetic material the body having a thickness and a surface, the method comprising:
   creating a first sign within the thickness of the body, said first sign contrasting with and being visible at said surface;
   applying to said surface a second sign said second sign contrasting with said surface and conforming in appearance with the first sign, said second sign being positioned on said surface to superimpose over and obliterate from view the first sign whereby if the or a part of the second sign becomes removed from the surface the or a part of the first sign previously obliterated thereby becomes visible.

8. The method of claim 7 wherein the first sign is created prior to the second sign.

9. The method of claim 7 wherein the second sign is created prior to the first sign.

10. The method of claim 7 wherein the first sign is created by laser engraving.

11. The method of claim 10 wherein the second sign is created by ink deposit on the surface.

12. The method of claim 7 wherein the laser engraving includes patterning a plurality of lines within the thickness of the body to form a collective of adjacent spaces and lines, wherein the collective defines a plurality of contours for the first sign.

13. The method of claim 12 wherein the second sign is created by inking surface markings on said surface.

14. The method according to claim 7 wherein the second sign is created by a deposited material on the surface.

* * * * *

UNITED STATES PATENT AND TRADEMARK OFFICE
CERTIFICATE OF CORRECTION

PATENT NO. : 6,779,815 B2  
APPLICATION NO. : 09/403357  
DATED : August 24, 2004  
INVENTOR(S) : Bernard Vandeputte Page 1 of 1

It is certified that error appears in the above-identified patent and that said Letters Patent is hereby corrected as shown below:

In column 4, line 1 – column 4, line 6, in Claim 1 delete "the second sign confirming in appearance with the first sign and being superimposed over the first sign to generally obliterate the first sign whereby if the or a part of the first sign becomes removed from the surface the or the part of the second sign previously obliterated by the first sign becomes visible" and insert -- the second sign confirming in appearance with the first sign and being superimposed over the first sign to generally obliterate the first sign whereby if the or a part of the second sign becomes removed from the surface the or the part of the first sign previously obliterated by the second sign becomes visible --.

Signed and Sealed this

Sixteenth Day of June, 2009

JOHN DOLL  
*Acting Director of the United States Patent and Trademark Office*